Nov. 10, 1931.  H. J. BURNISH  1,830,926
BURNISHING
Filed March 12, 1928

WITNESS
Fred Palm

INVENTOR.
HOWARD J. BURNISH
BY
W. H. Woolard
ATTORNEY.

Patented Nov. 10, 1931

1,830,926

UNITED STATES PATENT OFFICE

HOWARD J. BURNISH, OF MILWAUKEE, WISCONSIN, ASSIGNOR TO A. O. SMITH CORPORATION, OF MILWAUKEE, WISCONSIN, A CORPORATION OF NEW YORK

BURNISHING

Application filed March 12, 1928. Serial No. 260,834.

My invention relates primarily to burnishing the screw threads of certain objects, such as pipe and pipe couplings, for instance, so as to remove therefrom the rough and uneven surfaces of the screw threads produced in machining, the presence of which is unavoidable, no matter how accurate the adjustment of the machine may be. In the practice of my invention, I impart to such screw threads a smooth and hardened surface, wholly free from the irregularities which are produced in the machining operations, and which heretofore have constituted an obstruction which retarded the work of joining the screw threaded parts.

My invention resides in the application of radially exerted pressure, which is caused to bear with an even contact against both the sloping sides and the crown of the threads, to break down and smooth out the surface irregularities caused by machining. At the same time, the metal treated in practicing my method is compacted and refined, and a better molecular structure of the metal is secured. The connecting operation in which the screw threaded surfaces function is greatly facilitated, and a more intimate engagement of such surfaces is effected. Specifically stated, the screw threads, either internal or external, or both, are subjected to a rolling, pressing, or dragging operation, which irons out the irregularities resulting from machining, and the presence of which heretofore has required the expenditure of considerable force in effecting the operation of coupling. By compacting the rough, mill finished surfaces of such screw threads, and so removing the obstructions, the complemental threaded surfaces to be engaged slide freely over each other without resistance, and the connecting operation is performed much more easily, even to the last turn in coupling pipes.

The novelty residing in the invention will be pointed out in the appended claims.

Figure 6:
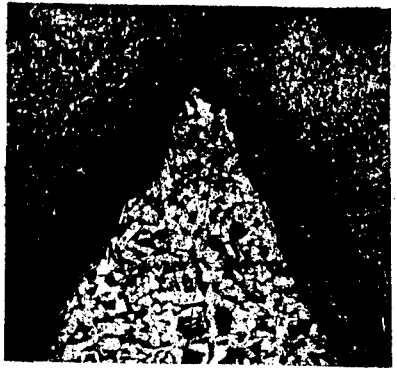
Fig. 6 is a microphotographic view illustrating in transverse section the contour of a thread as finished in the machining operation.
Figure 7:
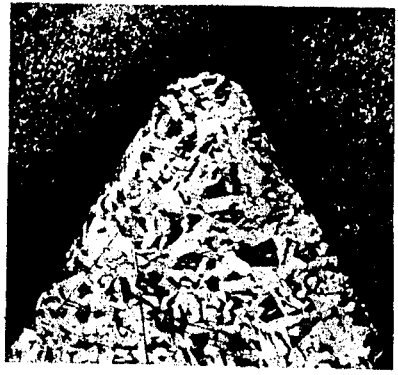
Fig. 7 is a like view of the same thread after it has been subjected to treatment in accordance with my method.

In the drawings, Fig. 6 is a reproduction of an actual photograph of a transverse section through a thread as it is produced in the machining operation, and Fig. 7 is a like view of the same thread after it has been subjected to treatment in accordance with my invention. In Figs. 6 and 7, the object is magnified one hundred diameters, and these views are presented for the purpose of enabling such comparison to be made as will permit a ready comprehension of the results which are attained in the use of my invention.

Screw threads, cut in the threading operation, are unavoidably left in a rough condition, by reason of the impossibility of making an entirely smooth cut by mechanical devices. While not apparent to the eye, the rough surfaces produced in the thread cutting operation greatly interfere with efficient coupling, and the resistance offered by the inequalities of the relatively moving meeting surfaces can be overcome only by the application of considerable force in effecting the coupling. But by my method, the threads to be engaged in coupling are refined and made smooth, so that they slide freely one over the other. By reason of their smoothness, and the absence of obstruction, inherent in the threads after the machining operation, the coupling is very easily made, even to the last turn.

Figure 1:
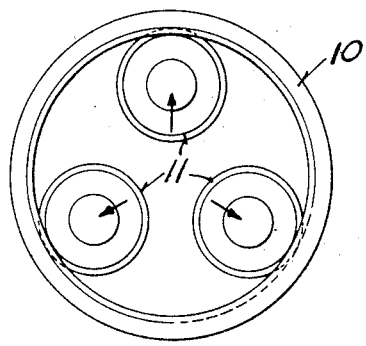
Figure 1 illustrates the application of my method to an internally screw threaded surface, such as is found in a pipe coupling, for instance.

In Fig. 1, the numeral 10 indicates a pipe coupling, provided interiorly with machine cut threads, which have generally the ragged and uneven formation illustrated in Fig. 6, and which, although of minute formation, act to interpose a high degree of resistance. In applying my burnishing or planishing method to a coupling, as in Fig. 1, the latter is suitably chucked, and a hardened steel roll 11, or a plurality of such rolls is arranged within the coupling, the rolls 11 having a pitch corresponding to that of the threaded surface of the coupling. Outward radial pressure being exerted upon the rolls 11, compression and refinement of the metal of the threads of the coupling is effected, so that the irregularities incident to machining are smoothed out, and a surface like that shown in Fig. 7 is produced.

Figure 2:
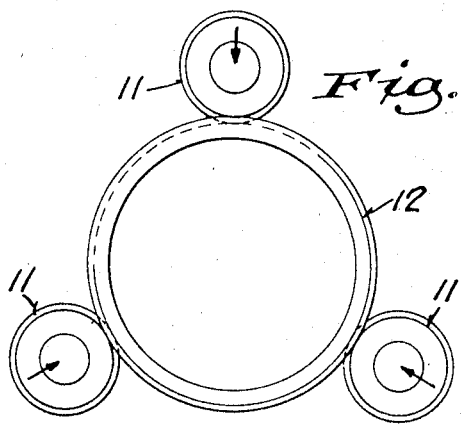
Fig. 2 illustrates the application of my method to external threads, such as are provided on the end of a length of pipe used in conjunction with the coupling shown in Fig. 1.
Figure 3:
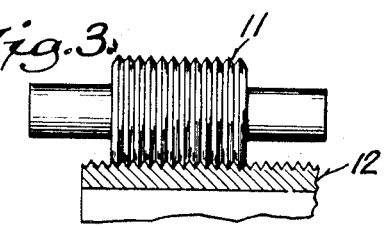
Fig. 3 is a view in side elevation of a roller such as may be used in practicing the invention in the manner illustrated in Fig. 2, that is, exteriorly of a pipe, a fragment of which is shown.

Fig. 2 illustrates the use of threaded rolls 11 in connection with the operation of burnishing the exterior threads at the end of a pipe 12, in connection with which the coupling 10 is intended to be used. The same improved condition of the threads at the end of the pipe 12, results from the application of an inward radial pressure, in accordance with my method.

It will be productive of better results, if the relative movements of the burnishing devices and threaded surfaces be at different rates of speed, so as to create a drag or slip on the threaded surfaces and insure smoothing of the threads.

Figure 4:
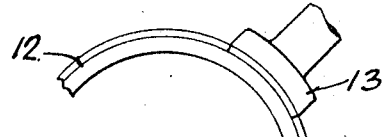
Figs. 4 and 5 are diagrammatic views illustrating comparatively the effects flowing from the practice of my invention.
Figure 4:
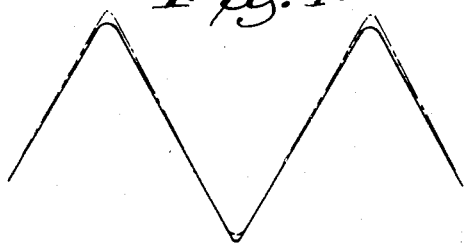
Figure 5:
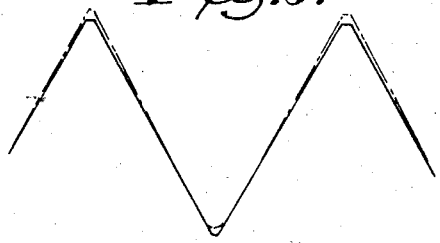

Figs. 4 and 5, are diagrammatic views, illustrating the compressing and refining action of the metal at the surfaces of the threads, which takes place in the practice of the invention. In both views, the broken lines indicate the radial cross sectional contour of the threads at the completion of the machining operation, while the solid lines indicate the same contour of the threads after the latter have been subjected to the treatment provided for by my invention. The views differ only in the respect that Fig. 4 shows both the crown and throat of the thread as of rounded formation, while Fig. 5 shows a flat crown and a rounded throat on the thread.

It is preferable that the greatest amount of compression of the metal be at the higher sides of the threads, or nearer their crowns, and to produce this result the burnishing devices are formed so as to effect the flow of the metal in such parts in the direction of the component of the radial and axial pressures exerted by the burnishing devices. The angular compression may lessen at the sides of the threads as the throat is approached, but the compressing action is extended so as to clearly define the throat between and at the base of the threads. Hence, in the treatment in accordance with my invention, the metal of screw threads is greatly refined under the pressure applied, and the surfaces of the threads are compacted and made smooth, so that the complemental parts to be coupled slide easily over each other, with the resistance to their relative movements reduced to a minimum. It follows that a much more perfect union between the parts is achieved by the intimate contact of the threaded surfaces, without the expenditure of the force heretofore required to overcome the resistance and effect the coupling of threaded surfaces which have not been so treated.

Having thus described my invention, what I claim and desire to secure by Letters Patent of the United States is:

1. A method of burnishing screw threads which includes applying radial pressure to the surface of said screw threads, rotating said screw threads and said pressure applying means independently of each other and at relatively different rates of speed to create friction between the respective surfaces of said pressure means and said screw threads causing a burnishing of said threads.

2. A method of burnishing screw threads which comprises applying a roller thereto having screw threads intermeshed therewith and of the same pitch, and effecting a frictional relative sliding movement between all engaging portions of said intermeshed threads under pressure.

In testimony whereof, I have signed my name at Milwaukee, this 28th day of February, 1928.

HOWARD J. BURNISH.